July 26, 1938.  R. URTEL  2,124,719
ELECTRIC WAVE GENERATOR
Filed April 27, 1935
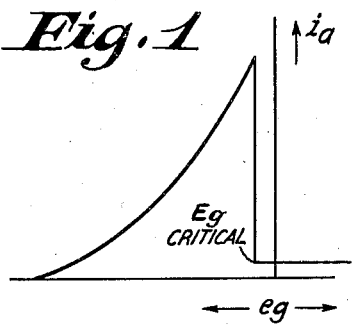
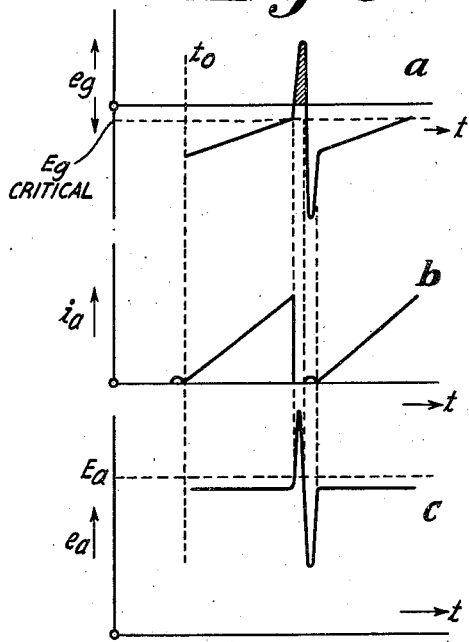
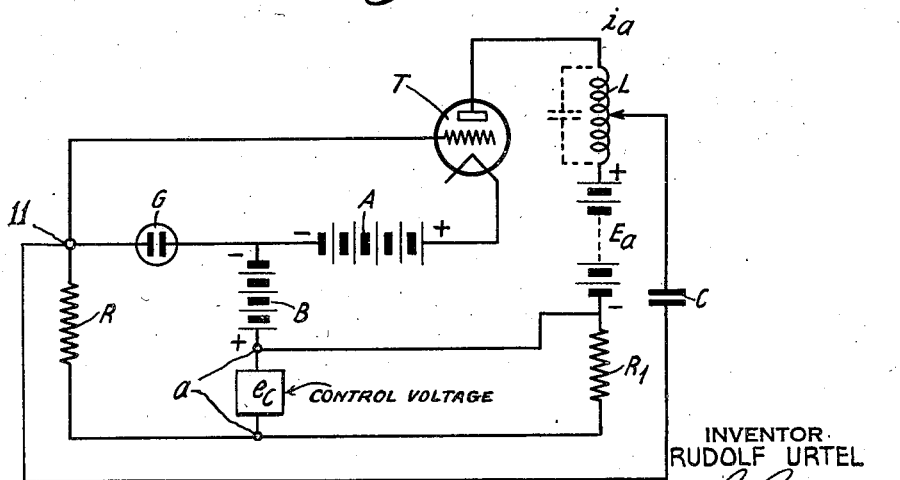
INVENTOR
RUDOLF URTEL
BY
ATTORNEY Patented July 26, 1938

2,124,719

UNITED STATES PATENT OFFICE 2,124,719

ELECTRIC WAVE GENERATOR

Rudolf Urtel, Berlin, Germany, assignor to Telefunken Gesellschaft für Drahtlose Telegraphie m. b. H., Berlin, Germany, a corporation of Germany Application April 27, 1935, Serial No. 18,687
In Germany April 23, 1934

3 Claims. (Cl. 250—36)

This invention relates to apparatus and method adapted to produce currents of serrated or saw-tooth wave formation.

One of the objects of the invention is that of providing ways and means to produce in a simple manner saw-tooth electrical wave formations by the use of relatively simple electrical apparatus. Other and related objects will follow from the following description of preferred ways and means to accomplish these objects when the description is read in conjunction with the accompanying drawing wherein:

Fig. 1 represents the general tube characteristic when current is plotted against voltage;

Fig. 2 shows one circuit arrangement; and

Fig. 3 shows by the curves divided into parts $a$, $b$ and $c$ the relationship between grid voltage and output currents in the tube plotted against time.

The invention as shown by the drawing is predicated upon some controllable device, such as a combination of a tube with a suitable auxiliary circuit means resulting in a characteristic of a kind or characteristic feature such that it presents substantially two branches whose slopes differ greatly in amount and have different signs. This has been shown by the curve of Fig. 1 wherein the critical grid voltage is also indicated.

An arrangement possessing a grid current-space charge characteristic is illustrated in Fig. 2. In Fig. 2 a conventional triode T has connected in its grid circuit an arrangement which modifies the normal grid voltage-space current characteristic. Connected to the grid of the tube T is a glow discharge device G whose other terminal is connected to the junction point of two potential sources shown as batteries A and B. The positive pole of the battery A is connected to the cathode of the tube. The battery B has its positive potential connected to one terminal of the source of the control potentials $e_c$. Connected to the same terminal of the battery is a resistor $R_1$, which resistor is connected to the other terminal of the source of control potential $e_c$ and also to a resistance R. The resistance R has its other terminal connected to the junction point of the glow tube G and the grid of the tube T. In series with the plate of the tube T is an inductance L, having inherent distributed capacity, connected in series with the battery $E_a$. A variable tap is provided on the inductance L which is connected to a condenser C, which condenser has its other terminal connected directly to the grid of the tube. The arrangement of the potential sources A and B is such as to maintain negative voltage on the grid of the tube T in the absence of applied voltages to the terminals $a$ and at the same time to provide a source of potential which may be used to cause current to flow through the glow tube G, which current is supplied by the battery B. If the potential applied across the terminals $a$ has such polarity that the positive pole of the source is connected to the battery B and the negative to the junction point which is common to the resistances R and $R_1$, then the total grid potential comprising the sources A, B and $e_c$, is negative and of such large value that cut-off potential is supplied to the grid so that the tube T is blocked and no plate current flows. If the control voltage $e_c$ decreases, the potential of the tube T will become less negative and plate current will commence to flow and increase as the control voltage decreases. While this is taking place, the total voltage acting on the grid glow tube G and comprising the source of potential B and $e_c$ will increase in magnitude since the source $e_c$ is poled to buck the voltage of the source B and $e_c$ decreases. When the decrease in potential of the potential $e_c$ reaches a certain value, the total voltage acting on the grid glow tube G is sufficient to initiate a discharge, at which point, due to the low internal impedance of glow tubes when discharging, the potential across G abruptly changes to a very low value. When this happens, the voltage which is effective to actuate the grid of the tube T is substantially that due to the battery A since the glow tube G acts effectively as a short circuit between the points of connection of the minus pole of the source B and the resistance R. This sudden and abrupt change in the grid potential to a negative value decreases the plate current despite the further decrease of the control voltage $e_c$. It will thus be seen that the resistances R and $R_1$ serve to limit the flow of current through the glow tube G in its discharging condition to prevent destruction of the tube. It will thus be seen that the arrangement of the potential sources A and B and the glow tube and the particular connections shown for supplying control voltage $e_c$ gives a space discharge current characteristic as shown in Fig. 1.

Suppose that, as assumed in the graphs of Fig. 3, at a definite instant $t_0$ the grid of tube T has a negative potential, as shown, for example, by Fig. 3$a$, of such magnitude that the plate current will just be blocked. Under this condition the condenser C shall have a charge leaking away with the time-constant CR. The grid voltage $e_g$ therefore grows slowly; and when it has attained the critical value indicated in Fig. 1, the plate current will sharply decrease to zero, as indicated by Fig. 3b. The result is a strong positive voltage impulse or shock at the plate which has been indicated by the curve of Fig. 3c owing to the coupling by way of the condenser C from L to the grid. It will be observed that the positive pulse is passed to the grid through the condenser C as is shown by the shaded portion of the graph of Fig. 3a, but that this effect follows only after the critical voltage is reached. The grid circuit then takes current so that, after the impulse or shock (whose duration is a function of the building-up period at L) has elapsed or ceased, a charge will remain across condenser C which will cause a shift of the grid voltage in negative sense. In view of the rapid return of the grid voltage, when the critical grid potential $E_g$ (critical) is passed, the plate current for a brief instant exhibits a tendency to rise. This results in a negative potential shock upon plate and grid. After this has been terminated, only the charge taken up during the positive shock produces a negative grid voltage. This charge is drained (or leaks away) through the resistance R such that the cycle can be resumed.

Having now described my invention, what is claimed and desired to secure by Letters Patent is the following:

1. In an oscillation generator, an electron tube having an electron emitting electrode and at least two cold electrodes, an inductance having one of its end terminals connected to the electron emitting electrode and its other end terminal connected to one of the cold electrodes, a capacity having one of its terminals connected to a second cold electrode and its other terminal connected to a point on the inductance intermediate the end terminals thereof, and a glow discharge tube connected between the electron emitting electrode and said second cold electrode.

2. In an oscillation generator, an electron tube having cathode, grid and plate electrodes, an inductance having one end terminal connected with the plate electrode and the other end terminal connected with the tube cathode, a capacity having one terminal connected with the grid and the other terminal connected to a point on the inductance intermediate the end terminals, a glow discharge tube connected between the cathode and grid, and a source of control voltages connected between the grid and cathode.

3. In an oscillation generator, an electron tube having cathode grid and plate electrodes, an inductance having one end terminal connected with the plate electrode and the other end terminal connected with the tube cathode, a capacity having one terminal connected to the grid and the other terminal connected to a point in the inductance intermediate the end terminals, means including a glow discharge tube connected between the cathode and grid electrodes and a source of control signals coupled to said means for initiating the discharge of the glow tube.

RUDOLF URTEL.